A. F. COBB.
Bee Hive.

No. 76,999. Patented April 21, 1868.

Witnesses:
W. C. Ashketter
J. A. Fraser

Inventor:
A. F. Cobb
per Munn & Co.
Attorneys.

United States Patent Office.

A. F. COBB, OF CHAPEL HILL, MISSOURI.

Letters Patent No. 76,999, dated April 21, 1868.

IMPROVEMENT IN BEE-HIVES.

The Schedule referred to in these Letters Patent and making part of the same.

TO ALL WHOM IT MAY CONCERN:

Be it known that I, A. F. COBB, of Chapel Hill, in the county of Lafayette, and State of Missouri, have invented a new and improved Bee-Hive; and I do hereby declare that the following is a full, clear, and exact description thereof, which will enable those skilled in the art to make and use the same, reference being had to the accompanying drawings, forming part of this specification.

This invention consists in constructing a bee-hive of metal, and coating the same internally with plaster of Paris and beeswax, as hereinafter fully shown and described, whereby the ravages of the moth, so destructive to bees, are fully guarded against, and, at the same time, a very economical and durable hive obtained, and one which may be kept well ventilated at a uniform temperature, or warm in winter and cool in summer.

In the accompanying sheet of drawings—

Figure 1:
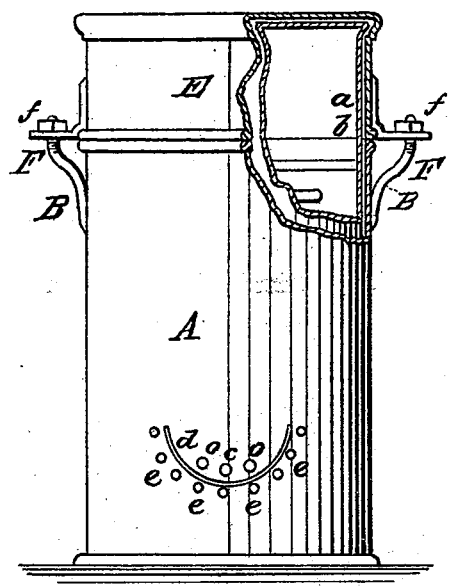

Figure 1 is a front elevation of my invention, partly in section.

Figure 2:
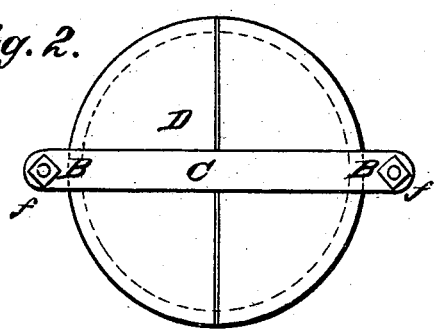

Figure 2, a plan or top view of the same.

Similar letters of reference indicate corresponding parts.

A represents the body or main portion of the hive, which may be of cylindrical or other form, and of any suitable dimensions.

The body or main portion A is constructed of metal—sheet iron will probably be used—well covered with paint externally, or galvanized, in order to prevent oxidation.

Internally, I design to apply a coat of paint, and, when the paint is dry, I apply a coat of plaster of Paris, $a$, and, after the latter has set, a coat of melted beeswax, $b$, is applied.

The plaster of Paris, being a poor conductor of heat, serves to keep the interior of the hive cool in summer and warm in winter, while the beeswax is designed to render the hive agreeable to the bees, enabling them to climb or travel up the sides thereof without any difficulty whatever.

The lower end of the hive is entirely open, and may, if desired, be covered with a screen or wire cloth, and placed upon a stone slab or other suitable base.

It (the hive) has a series of holes, $c$, perforated in its side, near its lower end, to serve as bee-entrances, which are directly over a semicircular horizontal flange or projection, $d$, attached to the exterior of the hive, to serve as an alighting-board; and below this flange there is a series of smaller perforations, $e$, for the purpose of ventilation.

During the winter season, when it is necessary to close or stop up the bee-entrances $c$, the smaller perforations $e$ will admit air sufficient to keep the hive in a properly-ventilated state.

To the upper part of the body or main portion A of the hive, at opposite points on its exterior, there are secured curved rods, B B, the upper ends of which have screw-threads cut on them to receive nuts $f$.

The upper ends of these rods, when the hive is not supplied with a spare-honey box, as in fig. 2, pass through a bar, C, one near each end of the latter, said bar resting or bearing on a lid or cover, D, which is firmly secured on the hive by screwing down the nuts $ff$.

When a spare-honey box, E, is applied, as shown in fig. 1, the upper ends of the rods B B pass through lugs F F, attached to the exterior of E, the nuts $ff$, by being screwed down, firmly securing the spare-honey box on the hive.

In consequence of having the hive constructed of metal, there is no crack or crevice in which the moth-miller can deposit its eggs, and the bees, consequently, will be protected from the ravages of that insect.

I claim as new, and desire to secure by Letters Patent—

A bee-hive, constructed of metal, and having its inner surface coated with plaster of Paris and beeswax, substantially in the manner as and for the purpose set forth.

A. F. COBB.

Witnesses:
ISAAC H. WOOD,
A. B. HEREFORD.